July 9, 1946.  M. WATTER  2,403,568
AIRCRAFT CONTROL SURFACE STRUCTURE AND METHOD OF ASSEMBLY OF SAME
Filed March 6, 1943  6 Sheets-Sheet 1
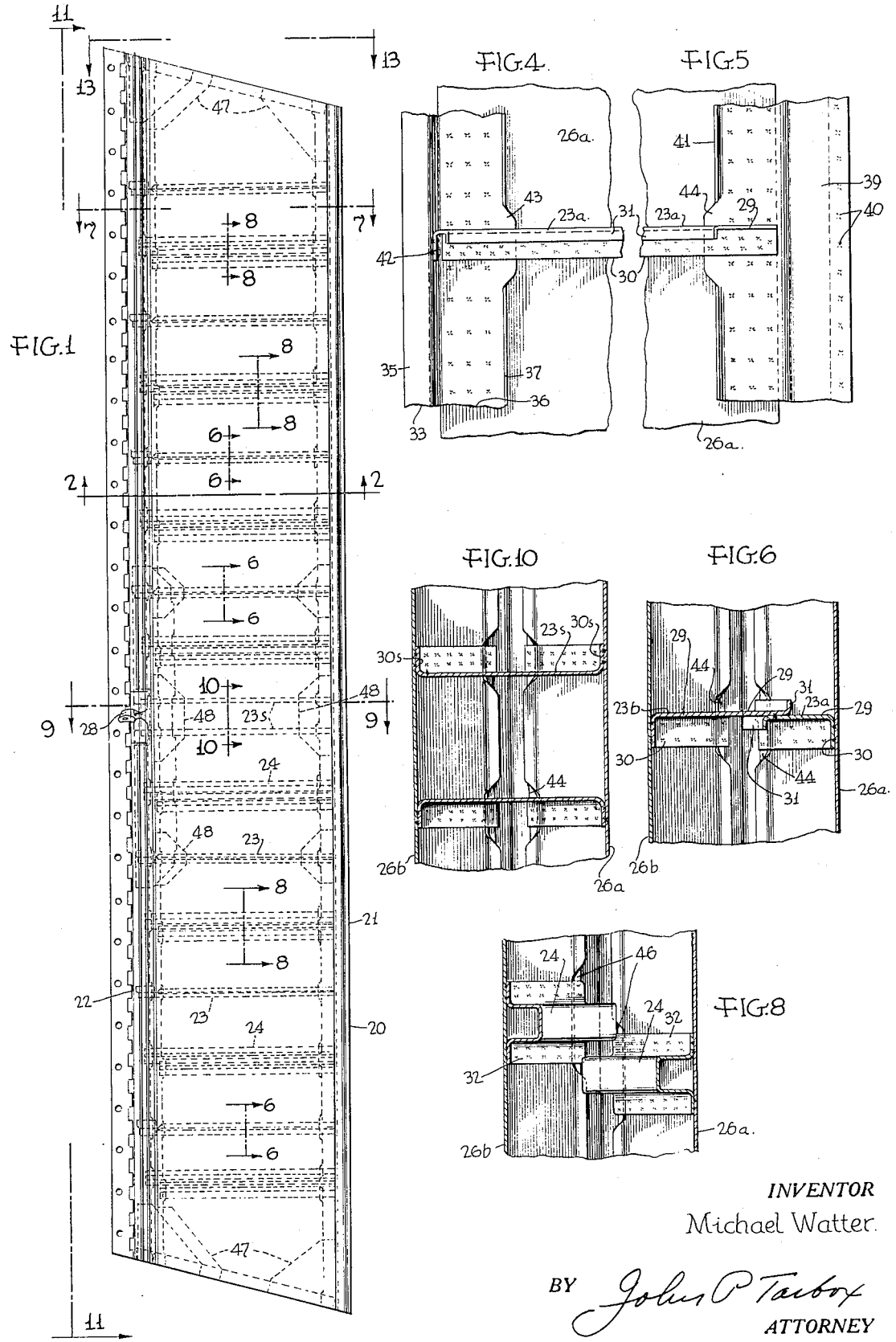
INVENTOR
Michael Watter.
BY John P Tarbox
ATTORNEY

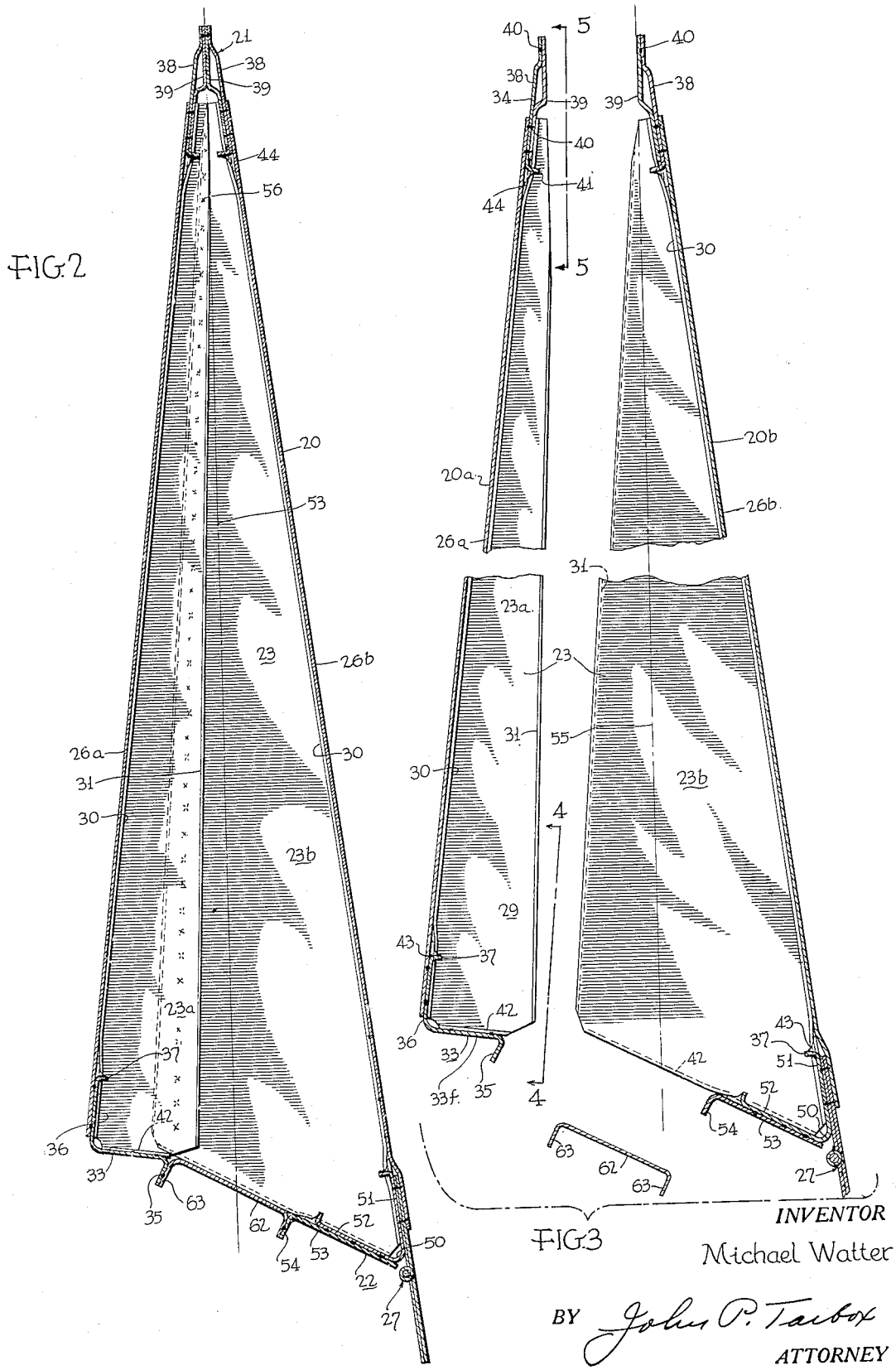

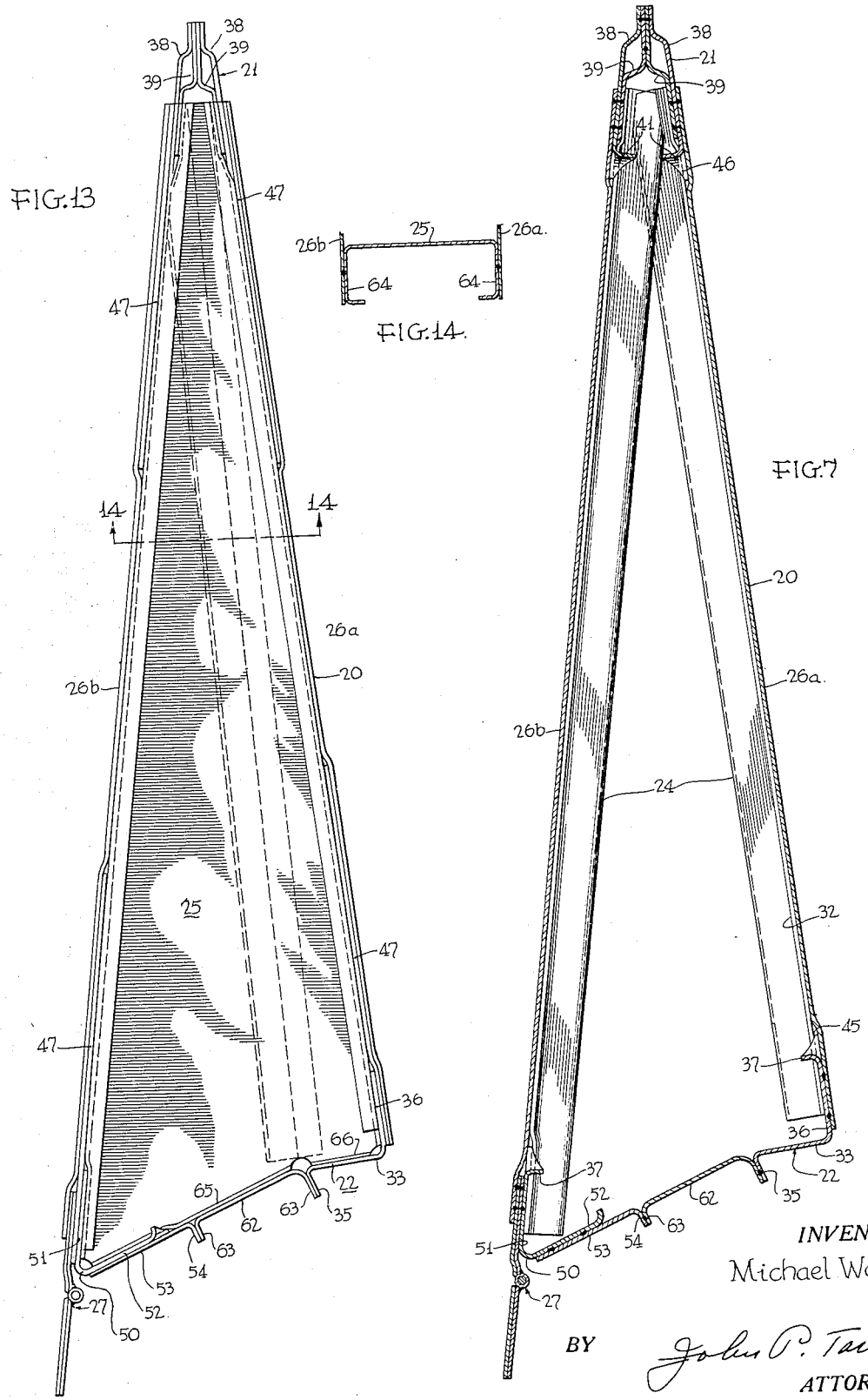

July 9, 1946. M. WATTER 2,403,568
AIRCRAFT CONTROL SURFACE STRUCTURE AND METHOD OF ASSEMBLY OF SAME
Filed March 6, 1943 6 Sheets-Sheet 4
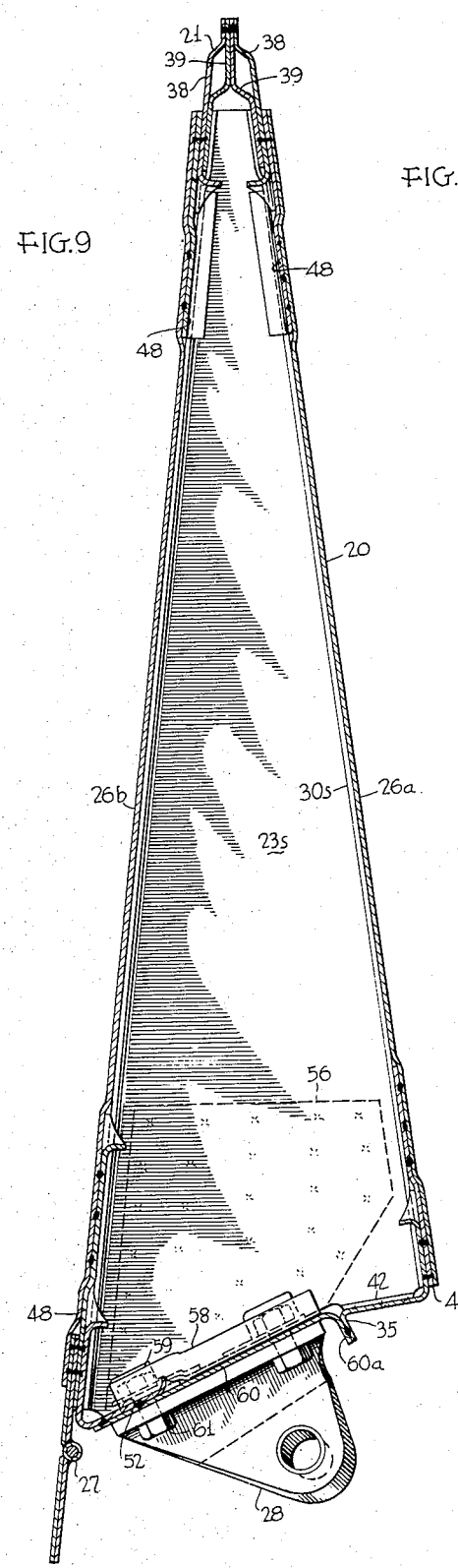
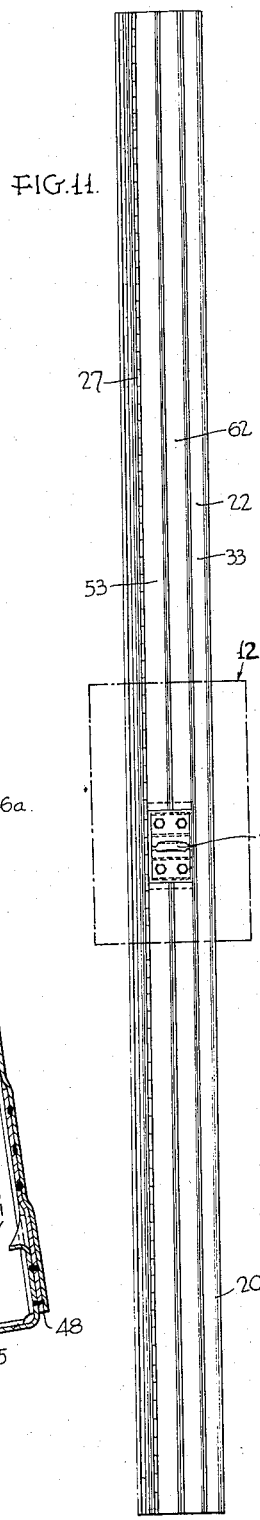
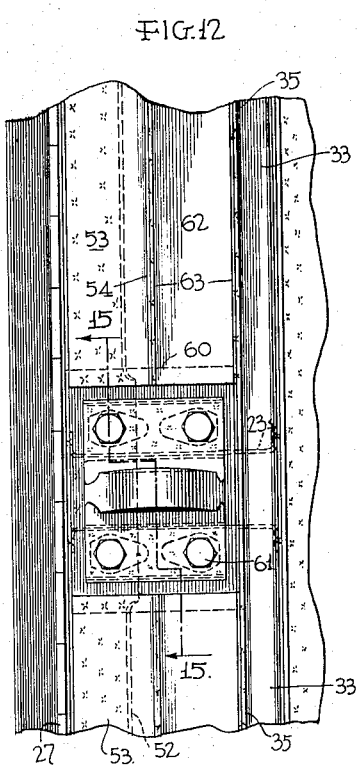
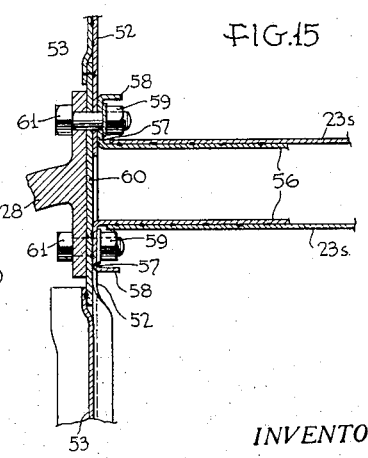
INVENTOR
Michael Watter
BY John P. Tarby
ATTORNEY July 9, 1946.  M. WATTER  2,403,568
AIRCRAFT CONTROL SURFACE STRUCTURE AND METHOD OF ASSEMBLY OF SAME
Filed March 6, 1943  6 Sheets-Sheet 5
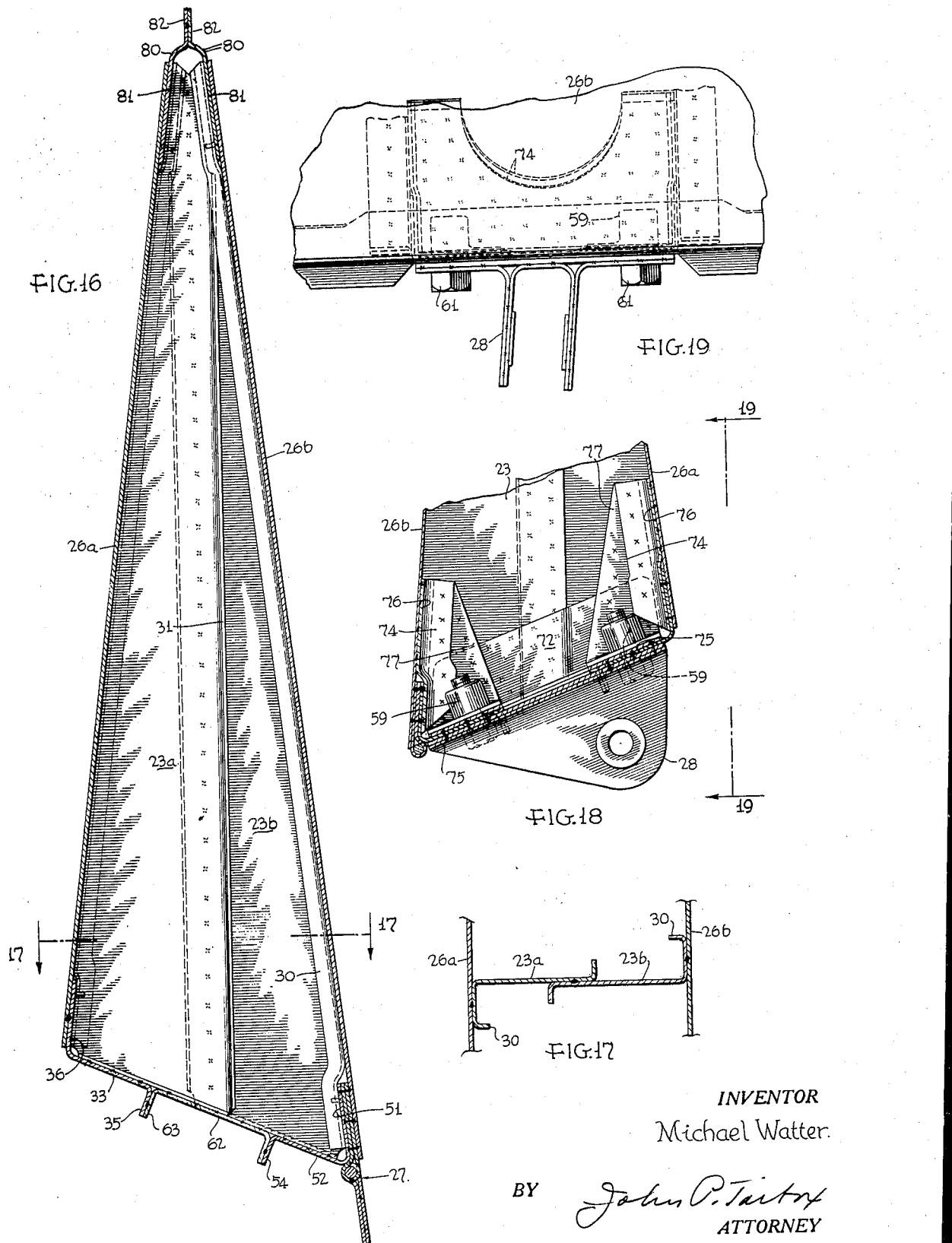
INVENTOR
Michael Watter.
BY
ATTORNEY July 9, 1946.  M. WATTER  2,403,568
AIRCRAFT CONTROL SURFACE STRUCTURE AND METHOD OF ASSEMBLY OF SAME
Filed March 6, 1943  6 Sheets-Sheet 6

INVENTOR
Michael Watter
BY John P. Tarbox
ATTORNEY

Patented July 9, 1946

2,403,568

UNITED STATES PATENT OFFICE 2,403,568

AIRCRAFT CONTROL SURFACE STRUCTURE AND METHOD OF ASSEMBLY OF SAME

Michael Watter, Philadelphia, Pa., assignor to Edward G. Budd Manufacturing Co., Philadelphia, Pa., a corporation of Pennsylvania Application March 6, 1943, Serial No. 478,230

18 Claims. (Cl. 244—123)

This invention relates to control surface structures for aircraft and the method of assembly thereof.

The present invention is directed to aircraft control surface structures, particularly to structures fabricated from sheet metal and in which the interrelated component parts thereof may be secured together by spot welding, the principal object being to provide sheet metal control surface structures, such as, for example, trim tabs and the like of light weight yet sturdy construction and so designed as to have improved torsional resistance characteristics.

Another object is to provide a control surface structure fabricated from sheet metal and having leading and trailing edges wherein the trailing edge is relatively thin but of rigid cross sectional formation and highly resistant to flexure incident to torsional stresses.

Another object is to provide a control surface structure having a leading edge with an improved means for mounting an actuating horn and for distributing the actuating stresses.

A further object is to provide a sheet metal control surface structure with a metal skin supporting framework having improved light weight yet high strength structural sections and having improved high strength joint connections between the component parts thereof.

A further object is to provide a control surface structure fabricated from sheet metal in which the various parts thereof are so designed and interrelated as to permit rapid assembly through use of welding tools and unobstructed access of such tools to the parts to be welded together.

A still further object is to provide a new and efficient method of assembly in the fabrication of a control surface structure from sheet metal.

With the above and other objects in view, the present invention consists in certain features of construction and combinations of parts and in certain steps in the assembly to be hereinafter described with reference to the accompanying drawings, and then claimed.

In the drawings which illustrate suitable embodiments of the invention,

Fig. 1 is a plan view looking toward one of the surfaces of the control surface trim tab selected for illustration;

Fig. 2 is a transverse section taken substantially on line 2—2 of Fig. 1 as looking toward one of the main ribs;

Fig. 3 is an exploded view showing the sub-assemblies comprising the parts illustrated in Fig. 1 to show a step in the assembly procedure;

Figs. 4 and 5 are fragmentary plan views of one of the sub-assemblies, looking in the direction of the arrows 4—4 and 5—5 respectively of Fig. 3.

Figure 21:
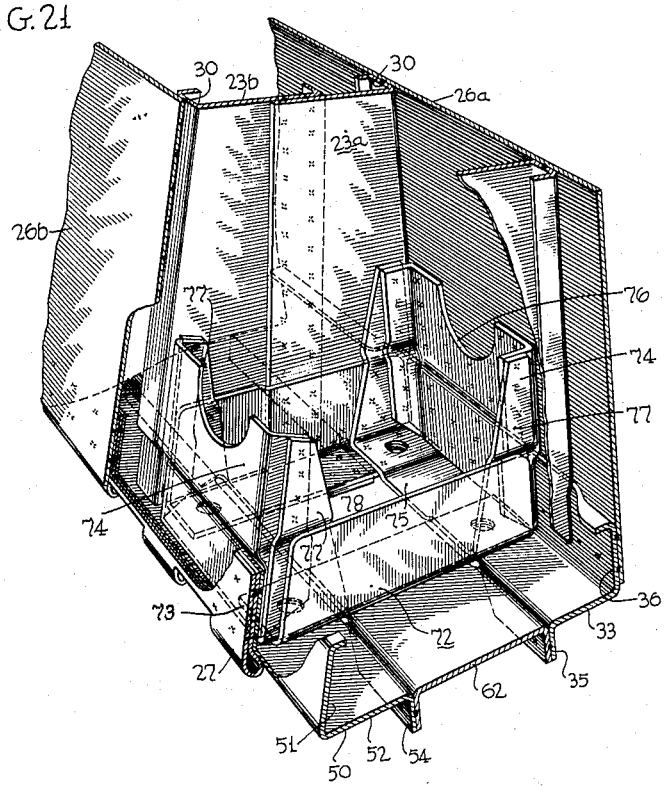
Figure 20:
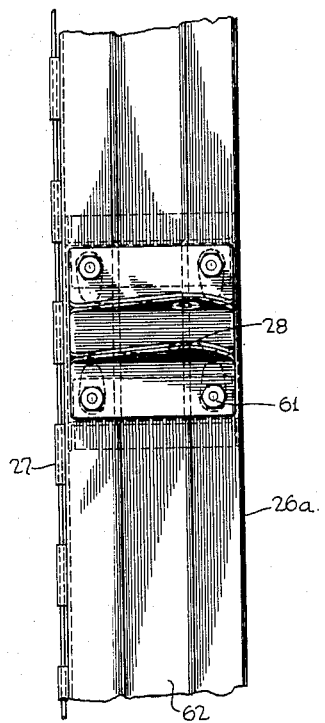
Figure 22:
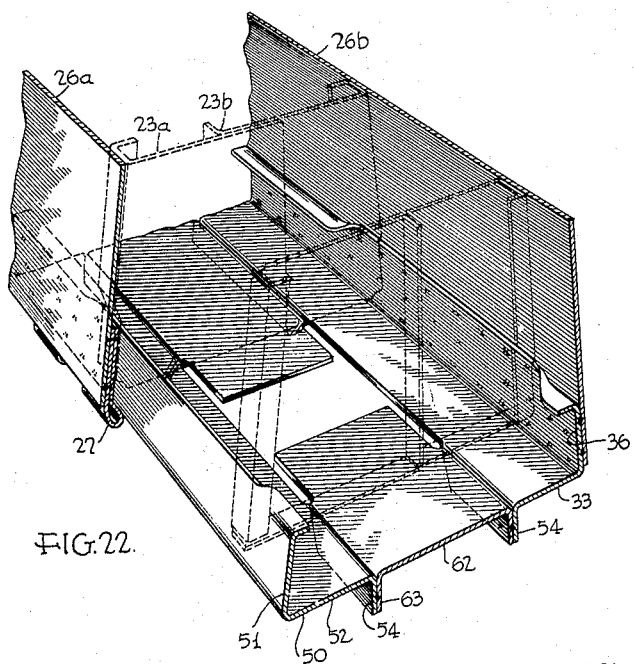

Fig. 6 is a longitudinal section taken on line 6—6 of Fig. 1, looking in the direction of the trailing edge to show the cross sectional shape of the main ribs;

Fig. 7 is a transverse section taken substantially on line 7—7 of Fig. 1 as looking toward the skin formers;

Fig. 8 is a section taken on line 8—8 of Fig. 1 showing the cross sectional shape of the skin formers;

Fig. 9 is a transverse section similar to Fig. 2 and taken on line 9—9 of Fig. 1 as looking toward one of the main ribs at the region of attachment of the actuating horn;

Fig. 10 is a section taken on line 10—10 of Fig. 1 through the main ribs at the regions of the attaching horn;

Fig. 11 is a side elevation looking toward the leading end portion of the structure as indicated by the line 11—11 of Fig. 1;

Fig. 12 is an enlarged view of the portion of the structure represented by the rectangle indicated by the broken line 12 of Fig. 11;

Fig. 13 is an end view taken as looking in the direction of the arrows 13—13 of Fig. 1;

Fig. 14 is a longitudinal section taken on the line 14—14 of Fig. 13 showing the end construction in cross section;

Fig. 15 is a horizontal section taken substantially on line 15—15 of Fig. 12 showing the attachment of the actuating horn to the strucure;

Fig. 16 is a transverse sectional view through a modified structure;

Fig. 17 is a longitudinal section taken substantially on line 17—17 of Fig. 16;

Fig. 18 is a view similar to the leading edge of Fig. 9 but of a modified horn attaching structure applicable for use in connection with the construction of Fig. 16;

Fig. 19 is a plan view of the portion shown in Fig. 18 taken as looking in the direction of the arrows 19—19 of Fig. 18;

Fig. 20 is a leading end view of the structure of Fig. 18;

Fig. 21 is a perspective view of the structure of Fig. 18, portions being taken away to illustrate the internal details; and Fig. 22 is a perspective view similar to Fig. 21, with portions of the internal structure removed.

Referring to the accompanying drawings in which like numerals refer to like parts throughout the several views, the control surface structure 20 shown therein is commonly known as a trim tab used in connection with main control surfaces, such as rudders, elevators and ailerons, it being understood however that the trim tab is selected for illustration only and that the present invention is equally as applicable to other control surfaces, such as, for example, ailerons, wing flaps and the like.

In practicing the invention, the entire structure is fabricated from sheet metal, such as, for example, stainless steel which is particularly adaptable for the use of spot welding as a means for securing the various component parts together. Stainless steel is of high tensile strength and light in weight and by the proper arrangement of the parts forming the completed shape a strong light weight structure can be provided. While it is the aim of the present invention to provide strength giving structural sections and joints it is also the aim to so arrange the component parts with respect to each other as facilitate assembly operations by providing unobstructed access to all parts to be joined together, particularly by spot welding.

In general, the trim tab 20 (Figs. 1, 2, 6 and 8) embodies a trailing edge portion 21, and a leading edge portion 22, interconnected by a plurality of main ribs 23 and skin formers 24, together with end closure plates 25, and covered with stress-carrying sheet metal skins 26a and 26b. A suitable hinge arrangement, such as a piano type hinge 27, is secured to the structure at the leading edge portion 22 substantially as a continuation of one of the skins 26b for mounting the trim tab 20 on a main control surface. A suitable actuating horn 28 is mounted on the leading edge portion 22 for pivoting the trim tab 20 about the axis of the hinge 27. The trim tab here shown is generally triangular shaped in cross section, the leading edge portion being of substantial depth and the skins 26a and 26b converging toward the trailing edge portion to thus streamline the structure.

With the general structure of the trim tab in mind, the tab now will be described in detail.

In order to facilitate the assembly of the various parts and to provide for easy, unobstructed access by spot welding apparatus, such as suitable welding tongs or guns, the structure is built up mainly in the form of two sub-assemblies, comprising as viewed in Figure 3, a left section 20a and a right section 20b. To this end the main ribs, except for certain ribs to be hereinafter described, are comprised of a left section 23a and a right section 23b so arranged that when the two sections are brought into their proper relative positions the rib sections will engage each other in overlapping relation as shown in Figs. 2, 6, and 10. The rib sections 23a and 23b are of flat sheet construction, each embodying a web 29 terminating at one edge in an attaching flange 30 extending from end to end for attachment to the skins and other frame parts, to be later described, by spot welding where indicated by spot welding designations, and, at its other edge, in a stiffening flange 31. The outer flanges 30 may extend in the same direction, if desired, as shown in Figure 6, but the flanges 31 extend in opposite directions to permit the webs 29 to engage each other in overlapping relation and be secured together by spot welding, as indicated by spot welding designations. The flanges 31 materially increase the torsional rigidity of each rib. At the leading edge, each rib is formed with an attaching flange 42, and these flanges, like the flanges 31 are oppositely arranged to permit overlapping of the webs 29.

Two main ribs 23s are employed at the regions of actuating horn 28 to rigidify and transmit the actuating forces throughout the width of the structure. These ribs are of single piece construction and provided with skin attaching flanges 30s. In these two ribs the leading edge flanges 42 are eliminated for a portion of their length, as shown in Figure 9, and replaced by strengthening gusset plates 56, spot welded (see spot welding designations in Fig. 9) to the ends of the ribs, the plates being formed with flanges 57 of substantial width, as shown in Fig. 15, which terminate in marginal flanges 58 generally parallel to the webs of the ribs. The flanges 57 are disposed in the planes of the flanges 42 of the other main rib sections 23b. Spot welded to the inner faces of the flanges 57 are suitable nuts 59, the flanges 57 being drilled with openings coaxial with the nuts which are adapted to receive cap screws 61 employed for mounting the actuating horn 28, as will be described later.

The formers 24, as shown in Fig. 8, are of hat-shaped section, having outwardly extending flanges 32 for spot welding attachment, as indicated by the spot welding designations, to the skins 26a and 26b. If desired and where greater strength is desired, it is obvious that the formers 24 may be replaced by ribs of the same character as the main ribs 23.

Torsional rigidity at the trailing end portion of each of the sections 20a and 20b is greatly enhanced in the construction of the present invention by means of a box-like structure or stringer 34 extending from end to end thereof and comprised of two strips 38 and 39 of sheet metal, each having an offset portion spot welded to the other to provide a hollow structure. The outermost strip 38 of each stringer 34 is formed with an inwardly extending marginal flange 41, as shown in Fig. 3 and the two strips are spot welded, as indicated at 40, to the ends of the rib sections. The strips 39 of each stringer 34 are so shaped as to provide flat faces which when the sections 20a and 20b are assembled, engage each other, as shown in Fig. 2, for spot welding attachment. At the regions where the stringers engage the ends of the rib sections, the flanges 41 are flattened, as indicated at 44 in Figs. 3 and 6. Similarly, the flanges 41 are flattened as at 46 to permit the flanges 32 of the formers 24 to intimately engage the inner faces of the strips 39 for spot welding attachment to the stringers 34, as shown in Figs. 7 and 8.

The leading end portion of the trim tab structure is provided with chord members, 33 for the section 20a and 50 for the section 20b, the chord member 33 having a flange portion 36 to the one side of which the flanges 30 of the rib sections 23a of the ribs 23s and the flanges 32 of the formers 24 are spot welded (see Figs. 3 and 7), and the chord member 50 having a flanged portion 51 to the one side of which the flange 30 of the main rib section 23b and the flanges 32 of the formers 24 are spot welded (see Figs. 3 and 7). The chord member 33 is also formed with a right angled portion 33f, which is spot welded to the end flanges 42 of the rib sections 23a as indicated by the spot welding indications in Fig.

3, the portion 33f terminating in a marginal flange 35 extending outwardly therefrom.

As shown in Fig. 3, the chord member 50 is of a generally V-shaped section and the one leg or flange portion 52 thereof engages and is spot welded to the end flanges 42 of the main rib sections 23b. Also spot welded to the flange portion 52 are plate-like members 53 having outwardly extending flanges 54.

The flange portions 36 and 51 of the chord members 33 and 50 respectively, are formed with marginal stiffening flanges 37 which are flattened as at 43 to permit flat engagement of the attaching flanges of the ribs and formers.

Referring to Figs. 9, 12 and 15 at the region of attachment of the actuating horn 28, a plate-like member 60 is spot welded, as shown by the spot welding indications, to the gusset flanges 57 and the leg 52 of chord member 50. The plate-like member 60 is provided with an outwardly extending flange 60a which is spot welded, as indicated in Fig. 9, to the flange 35 of the chord member 33.

The base of the horn 28 is secured to the plate-like member 60 by means of the cap screws 61 extending through the base and threadably received by the nuts 59, one of which is shown in section in Fig. 15.

It will be noted that at each side of the horn 28 the chord member flanges 35 and 54 are spaced apart a substantial distance. These spaces are closed by suitable channel members 62 extending from adjacent the horn 28, to the ends of the structure but overlapping, adjacent the horn 28, the plate 60 as shown in Fig. 12. One leg of flange 63 of the channel member is spot welded as indicated in Fig. 2 to the chord member flange 35 whereas the other leg of flange 63 is spot welded to the chord member flange 54. Also, the webs of the channel members 62 are spot welded to the end flanges 42 of the main rib sections 23b, as indicated by the spot welding designations in Fig. 12.

The ends 25 of the structure as shown in Figs. 13 and 14 are in the form of a one piece sheet having longitudinal flanges 64 nesting within the open ends of the structure and spot welded to the skins 26a and 26b, to the trailing edge sheets 38 and 39 and at the leading edge to the chord member flanges 36 and 51. The closure plates 25 also are provided with leading edge end flanges 65 and 66, the flanges 65 being spot welded to the chord member flange 52 and the web of the channel member 62 and the flanges 66 being spot welded to the chord member flange 33f.

In order to impart rigidity to the structure in the planes of the skins 26a and 26b it may be desirable to utilize additional gusset plates 47 at the corners of the structure as seen in Fig. 1, to brace such corners by interconnecting and being spot welded to the end closure flanges 64 and the chord member flanges 36 and 51, the plates 47 at the trailing edge being disposed between the skins 26a and 26b and the attachment flanges 64 and strips 38. Additional gusset plates 48 are employed intermediate the ends where greater strength is desired, such as indicated in Fig. 1. The cross sectional view of Fig. 9 shows a gusset plate 48 for the section 20a disposed between the skin 26a and chord member flange 36 and spot welded thereto, the plate also being spot welded to the main rib section flange 30. At the section 20b the gusset plate 48 is similarly disposed between the skin 26b and the rib sections flanges and the chord member flanges 51, the one plate of the hinge 27 being disposed between the skin 26b and the gusset plate 48.

The structure having been described in detail, the method of assembly will be next described. As previously mentioned, the structure is formed mainly of two sub-assemblies, viz: the left section 20a and the right sections 20b as viewed in Fig. 2. First considering the left section 20a, the box shaped member 34 having been built up from the offset strips 38 and 39, the member 34, the chord member 33 the main rib sections 23a and the formers 24 are arranged in their proper relative positions in a suitable jig with the ends of the rib flanges 30 and former flanges 32 seating against the inner sides of the chord member flange 36 and the strip 39.

The interengaging flanges are then spot welded together and the end flanges 42 of the rib sections 23a are spot welded to the web 33f of the chord member 33. The gusset plates 47 and 48 may then be properly located and spot welded to the main rib section flanges 30 and the chord member flanges 36 at the leading edge and to the united strips 38 and 39 at the trailing edge. Since the skin 26a has not been applied as yet unobstructed accessibility is had to all parts to be spot welded together. The skin 26a is next applied and spot welded through the use of suitable spot welding tongs to the rib sections flanges 30, the former flanges 32, the chord member flange 36 and the united strips 38 and 39, thus completing the left sections 20a.

The right section 20b is built up in the same manner except that prior to spot welding the leading edge of the skin 26b the one plate of the hinge 27 is spot welded to the chord member flange 51, the skin 26b then being spot welded through the combined thicknesses of the hinge plate and the flange 51. Also, the two single piece ribs 23s are assembled to this section.

In the case of the two ribs 23s to which the horn 28 is attached, the angle plates 56 preferably are spot welded thereto prior to the assembly of these ribs to the framework.

The two sections 20a and 20b are then placed in a suitable jig and clamped in their ultimate relative positions with respect to the main reference plane, indicated in broken outline in Figs. 2 and 3, in which positions the inner-most faces of the two trailing edge strips 39 engage each other, and, also, the rib sections 23a and 23b overlap and engage each other.

The trailing edges of the two box like structures 34 are then spot welded throughout their longitudinal extent through the four thicknesses of metal, it being obvious that free external access is had to these edges for the spot welding operation.

The overlapping rib sections 23a and 23b are next spot welded together, as indicated by the spot welding indications in Fig. 2, the rib flanges 30s also being spot welded to the skin 26a and stringers 34 and chord member flange 36, of Fig. 2, the relatively wide space between the flange 35 and the marginal edge of the chord member flange 52 providing convenient and unobstructed access for the insertion of welding tongs.

The plate 60 is next placed against the flanges 57 of the plates 56 and spot welded thereto and to the chord member flange 52 and the flange 60a thereof is spot welded to the outwardly extending flange 35 of the chord member 33. Here again, since the flanges 57 extend outwardly from the rib sections free access is had for spot welding through insertion of one of the tongs through the spaces between flange 35 and the marginal edge of the chord member flange 52.

Then, the plate-like elements 53 having the outwardly extending flanges 54 are spot welded to the chord member flange 52 with the inner ends overlapping the ends of the plate 60 (Fig. 12), by straddling the members 53 and flange 52 with the spot welding tongs, one of the tong arms being inserted through the aforesaid space.

The spaces defined by the outwardly extending flanges 35 and 54 are next closed in by the channel members 62, the flanges 63 thereof engaging the flanges 35 and 54 and extending outwardly the same as the flanges 35 and 54 whereby free unobstructed access is had thereto for spot welding the same together throughout their longitudinal extent.

The final step consists in nesting the end closures 25 within the open ends of the structure so assembled, and spot welding the flanges 64 thereof to the edges of the skins 26a and 26b and to the other parts as heretofore described, and the end flanges 65 and 66 to the portions 52, 62, and 33f.

The structure described provides a trim tab or similar article of increased strength but of light weight, particularly when fabricated of thin gauge stainless steel, the skins forming an integral portion of the structure and adding strength thereto.

The particular sections of the chord members and the trailing edge structure while facilitating assembly also materially contribute to the strength of the article in resisting torsion and flexing stresses. The ribs are also designed not only to facilitate assembly but also to impart strength and resist torsional stresses.

One important feature is that of the design of the component parts of the structure in such a manner as to permit easy and rapid assembly through spot welding wherein unobstructed access is had to all parts to be spot welded together.

Various changes may be made in the details of construction without departing from the spirit and substance of the invention. For example, as shown in Figs. 16 and 17, which are somewhat similar to Figs. 3 and 6, additional resistance to torsional stresses may be imparted to the rib sections 23a and 23b by forming the skin attaching flanges 30 with inturned marginal flanges, generally parallel to the plane of the rib. Another variation which may be effected is that of replacing the one piece end closure 25 previously described with a two piece structure similar to the main rib sections 23a and 23b but in which the skin attaching flanges 30 extend in the same direction to permit the end closure to be substantially flush with the ends of the skins 26a and 26b, the rib section stiffening flange also being removed.

Whereas in the construction of Figs. 1 to 15, the skin is not smooth at the regions of the gusset plates or the hinge 27, the construction of Fig. 16 may be employed where skin smoothness is a desirable feature, the rib section flanges 30 being appropriately offset for the reception of the skin interrupting portions, such as the hinge, to thereby provide a flush skin surface. In this construction the chord member 50, instead of having a separate flanged member attached thereto, has its branch 52 formed with an integral outwardly extending flange 54 corresponding to the flange 54 which in the previously described construction was provided on the separate plate-like member 53.

Another detail which may be varied is that of the mounting of the actuating horn. As shown in Figs. 18 to 22, no such plate as the previously described attaching plate 60 is employed. In this construction, the two ribs are of the same general construction as the other main ribs except that the flanges 30 extend in the same direction, and angle members 72 are spot welded to the leading ends of these ribs to provide end flanges 73 which only partially extend across the space between the ribs. In order to rigidify the structure at the attachment region, built-up channel-shaped gussets 74 are employed adjacent each skin, each having an end flange 75 spot welded to the flanges 73, and a web portion 76 completely bridging the space between the ribs adjacent the skins and terminating in side flange 77 which are spot welded to the adjacent rib sections, the web portion 76 of one such gusset being spot welded to the chord member flange 36 and the web portion 76 being spot welded to the other chord member flange 51. It will be noted that the end flanges 75 of the gussets 74 and the flanges 73 thus define an opening 78 to provide access for the welding tongs. The nuts 59, corresponding to those of Figs. 9 and 14, are securely carried at the inner faces of the gusset flanges 75 for attachment of the actuating horn 28.

Another detail which may be altered is that of the detailed construction of the trailing edge portion. As shown in the modified construction Fig. 16, the trailing edge of each of the sections 20a and 20b is in the form of a single sheet 80 of metal having laterally offset portions 81 and 82 interconnected by an integral arcuate portion such that the portions 82 of the two sections will engage each other for spot welded attachment to each other, the opposite portions 81 being spot welded to the ends of the rib sections and the arcuate portions combining to constitute a semicircular section highly resistant to torsion stresses.

Obviously, other detailed changes may be made both in the structure and in the assembly sequence without departing from the spirit and substance of the invention, the scope of which is defined by the appended claims.

What is claimed is:

1. In an aircraft control surface structure having trailing and leading edges and a plurality of spanwise spaced metallic ribs, each having chordwise portions converging toward said trailing edge, a trailing edge structure comprising a pair of metallic elements bridging the trailing ends of said ribs, each of said elements having substantially longitudinally continuous rearward portions engaging and securely attached to each other, substantially longitudinally continuous forward portions laterally spaced apart, the one rigidly secured to said chordwise portions at one side of and the other rigidly secured to said chordwise portions at the other side of said structure, and intermediate portions integrally connecting said forward and rearward portions, said intermediate portions being of hollow box-like cross section.

2. In an aircraft control surface structure having trailing and leading edges and a plurality of spanwise spaced metallic ribs, each having chordwise portions converging toward said trailing edge, a trailing edge structure comprising a pair of metallic elements bridging the trailing ends of said ribs, each of said elements including a pair of sheet metal strips, each of step-like cross section to provide laterally offset marginal leading and trailing portions and a transverse interconnecting portion, the leading portions of said strips being spotwelded together and the trailing portions being spotwelded together with the interconnecting portions thereof spaced apart to provide a closed box-like section, the secured trailing portions of the one element engaging and being spotwelded to the secured trailing portions of the other element, and the secured leading portions of said elements being laterally spaced apart, the one being spotwelded to the chordwise rib portions at one side and the other being spotwelded to the chordwise rib portions at the other side of said structure.

3. In an aircraft control surface structure having leading and trailing edges and a plurality of spanwise spaced metallic ribs, a pair of metallic chord members of angle-shaped cross section, one leg of one member bridging and being securely attached to said ribs at one side of said structure and one leg of the other member bridging and being securely attached to said ribs at the other side of said structure, the other legs of said members extending toward each other and bridging the leading ends of said ribs and terminating in marginal flanges extending outwardly of said structure, said flanges being generally parallel and spaced from each other, and a channel-shaped sheet metal member disposed in the space between said flanges and having each of its legs extending in the same direction as and engaging the adjacent flange, the engaging legs and flanges being securely attached to each other.

4. In an aircraft control surface structure having leading and trailing edges and a plurality of spanwise spaced metallic ribs, a pair of metallic chord members of angle-shaped cross section, one leg of one member bridging and being securely attached to said ribs at one side of said structure and one leg of the other member bridging and being securely attached to said ribs at the other side of said structure, the other legs of said members extending toward each other and bridging the leading ends of said ribs and terminating in marginal flanges extending outwardly of said structure, said flanges being generally parallel and spaced from each other, and a channel-shaped sheet metal member disposed in the space between said flanges and having each of its legs extending in the same direction as and engaging the adjacent flange, the engaging legs and flanges being securely attached to each other, the leading ends of said ribs having lateral flanges parallel to the chord member legs which bridge the rib ends, said last-mentioned flanges being securely attached to said last-mentioned legs.

5. A sheet metal control surface structure having a leading edge of substantial depth, comprising a hinge for pivotally supporting said structure at said leading edge, a plurality of spaced ribs extending from said leading edge, two of said ribs being relatively closely spaced, sheet metal reinforcing elements rigidly secured to the sides of said two ribs at the leading ends thereof and having laterally extending coplanar end flanges generally parallel to said leading edge, a sheet metal member bridging said end flanges and being rigidly secured thereto, and an actuating horn having a base portion secured to said structure through said end flanges and sheet metal member, said sheet metal member and sheet metal reinforcing elements rigidifying said structure at the region of said two ribs for the distribution of actuating stresses therethrough.

6. A sheet metal control surface structure having a leading edge of substantial depth, comprising a plurality of spaced ribs extending from said leading edge, a pair of spanwise extending chord members bridging the leading ends of said ribs and interconnecting the same adjacent the sides of said structure, said members being spaced apart, two of said ribs having strengthening sheet metal elements secured to the sides of the leading ends thereof, said elements having laterally extending generally coplanar end flanges disposed at said leading edge, said end flanges being rigidly secured to at least one of said chord members, a plate-like sheet metal member bridging said end flanges and being rigidly secured thereto and to at least said one chord member, and an actuating horn having a base portion secured to said structure through said flanges and sheet metal member.

7. A sheet metal control surface structure having a leading edge of substantial depth, comprising a plurality of spaced ribs extending from said leading edge, a pair of spanwise extending chord members bridging the leading ends of said ribs and interconnecting the same adjacent the sides of said structure, said members being spaced apart, two of said ribs having strengthening sheet metal elements secured to the sides of the leading ends thereof, said elements having laterally extending generally coplanar end flanges disposed at said leading edge, said end flanges being rigidly secured to at least one of said chord members, a plate-like sheet metal member bridging said end flanges and being rigidly secured thereto and to at least said one chord member, and an actuating horn having a base portion abutting said leading edge exteriorly thereof at the region of said two ribs, and bolt means extending through said base portion, plate-like sheet metal member and flanges for securing said actuating horn to said structure.

8. A sheet metal control surface structure having a leading edge of substantial depth, comprising a plurality of spaced ribs extending from said leading edge, a pair of spanwise extending chord members bridging the leading ends of said ribs and interconnecting the same adjacent the sides of said structure, said members being spaced apart, two of said ribs having strengthening sheet metal elements secured to the sides of the leading ends thereof, said elements having laterally extending generally coplanar end flanges disposed at said leading edge, said flanges being spaced apart, bridging said chord members and being rigidly secured thereto, a pair of sheet metal members extending between said ribs interiorly of said structure adjacent said leading end, the one adjacent the one side and the other adjacent the other side of said structure, each having side flanges rigidly attached to the sides of said ribs and an end flange bridging and rigidly secured to said first-mentioned flanges, and an actuating horn having a base portion abutting said chord members at the region of said first-mentioned flanges together with bolt means for securing said base to said structure through said attached chord members, first-mentioned flanges and second-mentioned flanges.

9. A control surface structure comprising a framework including a plurality of spanwise spaced ribs extending from the leading edge to the trailing edge thereof and leading and trailing edge members interconnecting said ribs, and sheet metal skins covering the sides of said structure, certain of said ribs comprising chordwise divided sections, each section being of a single sheet metal piece overlapping and shear-connected to the other at least at spaced intervals from end to end and having an outer marginal connection to the adjacent sheet metal skin and an inner marginal stiffening flange extending substantially from end to end, said stiffening flanges being disposed at opposite sides of the shear connections of said rib sections and extending in opposite directions from said rib sections.

10. A control surface structure comprising a framework including a plurality of spanwise spaced ribs extending from the leading edge to the trailing edge thereof and leading and trailing edge members interconnecting said ribs, and sheet metal skins covering the sides of said structure, certain of said ribs comprising chordwise divided sections, each section being of a single sheet metal piece overlapping and shear-connected to the other at least at spaced intervals from end to end, one of said sections being of channel-shaped and the other being of Z-shaped cross-section substantially throughout the lengths thereof, the outer marginal flanges of said sections being connected to the adjacent sheet metal skins, and the inner marginal flanges extending in opposite directions from said sections and being disposed at opposite sides of the shear connections of said sections.

11. A control surface structure comprising two divided sections each comprising substantially continuous leading and trailing edge elements, a plurality of ribs extending between and secured to said elements and a sheet metal skin secured to said elements and ribs at one side of the structure, said ribs engaging each other in overlapping relation throughout their length and being secured together at least at spaced intervals throughout their length and said trailing edge elements engaging each other and being secured together at least at spaced intervals throughout their length, said leading edge elements having spanwise extending portions bridging the leading ends of the rib sections, said portions terminating in marginal flanges extending outwardly away from the leading edge of the structure and being spaced apart longitudinally thereof, said structure including a channel-shaped closure structure closing the space between said flanges and having its flanged sides secured to said spaced flanges.

12. The method of constructing a sheet metal control surface structure which consists in constructing two frame sections, each of leading and trailing edge sheet metal elements, spaced interconnecting sheet metal sheet-like rib sections of lesser depth than the depth of said structure and a sheet metal skin secured to said elements and ribs, bringing said sections together with said trailing edge elements engaging each other and said leading edge elements spaced apart and with said rib sections engaging each other in overlapping relation, then externally of said structure securing said trailing edge elements together and from the leading open edge of the structure interiorly securing said overlapping rib sections together, and thereafter closing in the space between the leading edge elements.

13. The method of constructing a closed sheet metal control surface structure which consists in constructing two separate sections, each of spaced, sheet metal, rib sections of lesser depth than the structure, a sheet metal trailing edge element interconnecting said sections at one end and having substantially flat-faced rearwardly extending flange-like longitudinal portion, a sheet metal leading edge element interconnecting said rib sections at the other end thereof and having a forwardly extending flange-like longitudinal portion, bringing said sections into adjacent relation with said flat-faced longitudinal portions engaging each other and said forwardly extending portions spaced apart and with said rib sections in overlapping engagement, spot welding said engaging longitudinal portions together at intervals throughout the length thereof and, by reaching from the leading open edge of the structure through the space between said forwardly extending portions, spot welding the overlapping rib sections together, and thereafter disposing a sheet metal channel-shaped element in the space between said forwardly extending portions and spot welding the flanges of said last-named element to said forwardly extending portions.

14. A control surface structure comprising two divided sections, each section comprising substantially continuous leading and trailing edge elements, a plurality of rib elements extending between and secured to said leading edge and trailing edge elements, and a sheet metal skin secured to said leading edge, trailing edge, and rib elements to form one outer side of the entire structure, said rib elements being flanged on their inner edges and in final assembly of the structure engaging mating rib elements of the opposite section with the rib elements overlapping along faying surfaces throughout their length and with their inner edge flanges disposed on opposite sides of the faying plane of overlap; the rib elements being secured together in their overlap between their edge flanges at least at spaced intervals throughout their length, and said trailing edge elements of opposite sections engaging each other and being secured together at spaced intervals throughout their length on the outside of the assembled structure.

15. A control surface structure comprising two divided sections, each section comprising substantially continuous leading and trailing edge elements, a plurality of rib elements extending between and secured to said leading edge and trailing edge elements, and a sheet metal skin secured to said leading edge, trailing edge, and rib elements to form one outer side of the entire structure, said rib elements in final assembly engaging mating rib elements of the opposite section in overlapping relation along faying surfaces throughout their length and with their inner edges disposed on opposite sides of the faying plane of overlap, the rib elements being secured together between their inner edges in their overlap between their inner edges at least at spaced intervals throughout their length, said trailing edge elements of opposite sections engaging each other and being secured together at least at spaced intervals throughout their length, and said leading edge elements of opposite sections being spaced apart and having portions extending transversely of the ribs and bridging the ends of the ribs together, and sheet metal means extending between the leading edge elements of opposite sections and secured thereto to form a leading edge enclosure for the assembled structure.

16. A metallic structure, such as an airfoil, comprising spaced sheet metal skin sheets and a plurality of spaced generally parallel ribs disposed between said skins, each of said ribs comprising sheet-like metal rib elements engaging each other in overlapping relation along faying surfaces throughout their length and having at the overlapping edges thereof marginal stiffening flanges extending oppositely with respect to each other, the rib flanges of overlapped rib elements being disposed on opposite sides of the faying plane of overlap, said rib elements being rigidly interconnected in shear at least at a plurality of longitudinally spaced intervals throughout their length in the faying surface region between said marginal flanges, and connections between each rib element and the adjacent skin sheet.

17. A bi-partite metallic structure having spaced sheet metal skins disposed on opposite sides of an intermediate reference plane surface which is generally parallel to the skin sheets, rib elements secured to the skins and disposed in planes which are approximately perpendicular to the reference plane surface and skins, the rib elements having their edges overlapped along faying surfaces in said perpendicular planes and secured together at the faying surfaces throughout their entire length, and strips secured to said skins exteriorly of the assembly, the strips meeting in planes approximately parallel to the reference plane and perpendicular to the rib planes, said strips being secured together throughout their length.

18. A bi-partite metallic structure having spaced sheet metal skins disposed on opposite sides of an intermediate reference plane surface which is generally parallel to the skin sheets, rib elements secured to the skins and disposed in planes which are approximately perpendicular to the reference plane surface and skins, the rib elements having their edges overlapped along faying surfaces in said perpendicular planes and secured together at the faying surfaces throughout their entire length, and strips secured to said skins exteriorly of the assembly, the strips meeting in planes approximately parallel to the reference plane and perpendicular to the rib planes, said strips being secured together throughout their length, said structure being adapted to travel through a fluid as an airfoil or the like and in which the reference plane, rib elements, skins and strips are all disposed approximately parallel to the direction of travel through the fluid.

MICHAEL WATTER.